United States Patent [19]
Refregier et al.

[11] Patent Number: 5,317,651
[45] Date of Patent: May 31, 1994

[54] NON-LINEAR AND ADAPTIVE SIGNAL-PROCESSING DEVICE

[75] Inventors: Philippe Refregier, Gif sur Yvette; Jean-Pierre Huignard, Paris, both of France

[73] Assignee: Thomson-CSF, Puteaux, France

[21] Appl. No.: 58,229

[22] Filed: May 10, 1993

Related U.S. Application Data

[63] Continuation of Ser. No. 845,789, Mar. 9, 1992, abandoned, which is a continuation of Ser. No. 460,974, filed as PCT/FR89/00326, June 23, 1989, abandoned.

[30] Foreign Application Priority Data

Jun. 24, 1988 [FR] France .................. 88 08521

[51] Int. Cl.$^5$ .................. G06K 9/62; G06K 9/76; G03H 1/16; G02B 27/46
[52] U.S. Cl. .................. 382/31; 382/14; 359/29; 359/559; 359/561
[58] Field of Search .................. 382/1, 14, 31, 42, 43; 350/3.82, 3.6, 162.12, 162.13, 3.67, 3.68; 356/347; 364/822; 365/125; G06K 9/00, 9/62, 9/76, 9/36, 9/64; G03H 1/16, 1/02, 1/10; G02B 27/42, 27/46, 1/12; G01B 9/021; G06E 3/00; G11C 13/04

[56] References Cited

U.S. PATENT DOCUMENTS

| | | | |
|---|---|---|---|
| 4,809,340 | 2/1989 | Mersereau | 382/31 |
| 4,892,408 | 1/1990 | Pernick et al. | 382/31 |
| 4,908,702 | 3/1990 | Chao et al. | 382/31 |
| 4,949,389 | 8/1990 | Allebach et al. | 382/31 |
| 4,995,088 | 2/1991 | Farhat | 382/14 |
| 5,020,111 | 5/1991 | Weber | 382/31 |

FOREIGN PATENT DOCUMENTS

| | | | |
|---|---|---|---|
| 2604283 | 3/1988 | France | G11C 11/22 |
| 1077380 | 7/1967 | United Kingdom | G06K 9/08 |

OTHER PUBLICATIONS

Proceedings of the National Electronics Conference, Chicago, IL, 25-27, Oct. 1965, vol. 21, W. A. Huber: "Learning machine techniques for pattern classification voir figures 1,2,6,7"; p. 517.

Proceedings of the 6th International Conference on Pattern Recognition, Munich, Oct. 19-22, 1981, vol. 1, IEEE Computer Society Press, F. Zimmermann et al.: "Hybrid image processing", pp. 51-53.

EOSD Electro-Optical Systems Design, vol. 12, No. 11, Nov. 1980, D. Casasent: "Optical pattern recognition", pp. 33-39.

L'Onde Electrique, vol. 52, fac. 10, Nov. 1972, A. Bruel et al.: "Realisation par calculateur de plans de memoire holographique de masse", pp. 439-445.

Applies Optics, vol. 21, No. 2, Jan. 1982, Optical Soc. of America, J. R. Leter et al.: "Hybrid optical processor for pattern recognition and classification using a generalized set of pattern functions", pp. 274-287.

GEC Journal of Research, vol. 1, No. 2, 1983, Rugby, L. C. Laycock, et al.: "Two-dimensional optical image processing for pattern recognition", pp. 127-135.

Computer, vol. 21, No. 3, Mar. 1988, IEEE, H. P. Graf et al.: "VLSI implementation of a neural network model", pp. 41-48.

Primary Examiner—Jose L. Couso
Attorney, Agent, or Firm—Oblon, Spivak, McClelland, Maier & Neustadt

[57] ABSTRACT

A signal processing device used for processing images including an optical correlator combined with a neuonal processor.

19 Claims, 4 Drawing Sheets

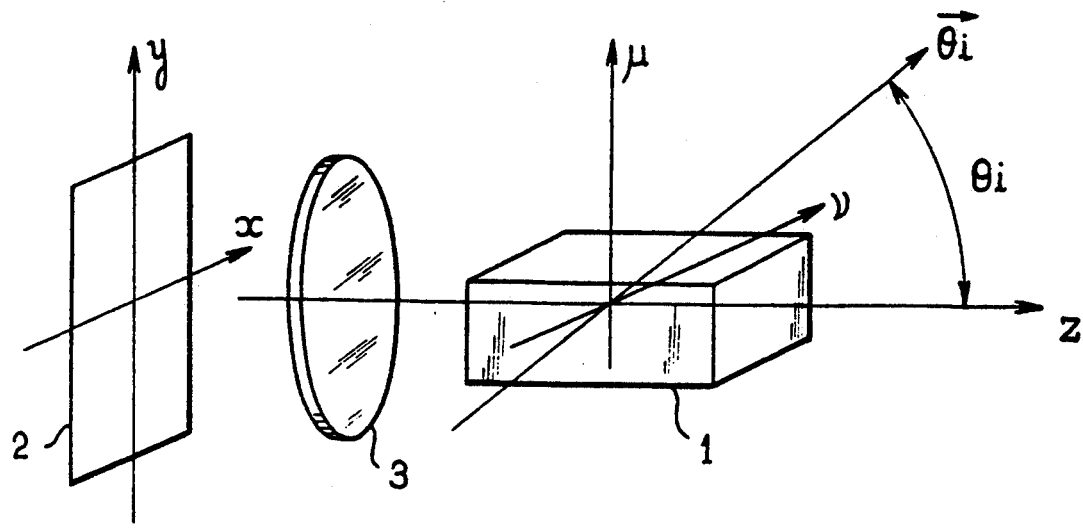
FIG_1
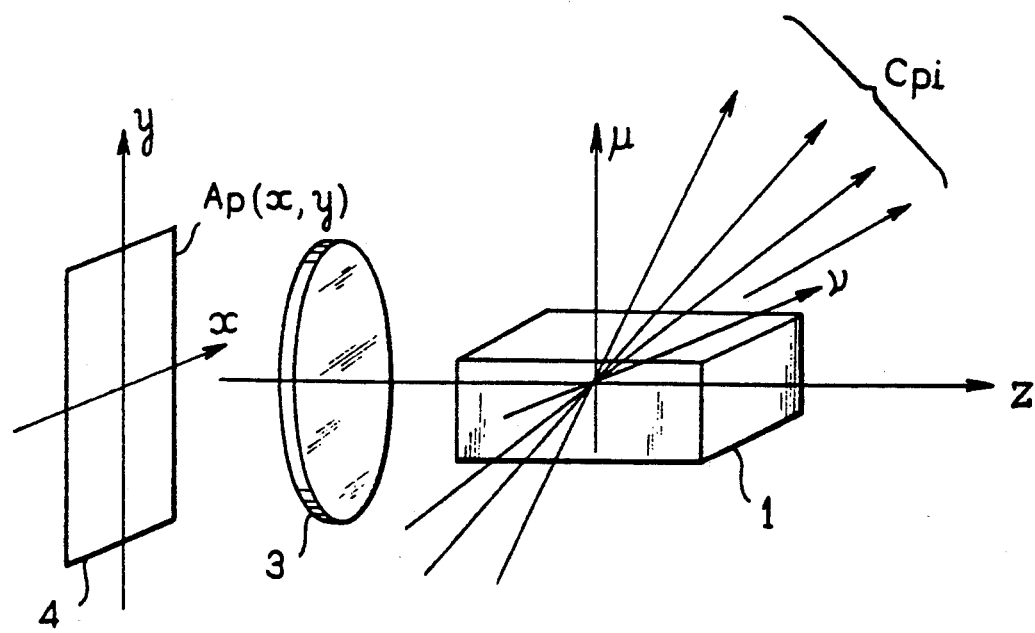
FIG_2

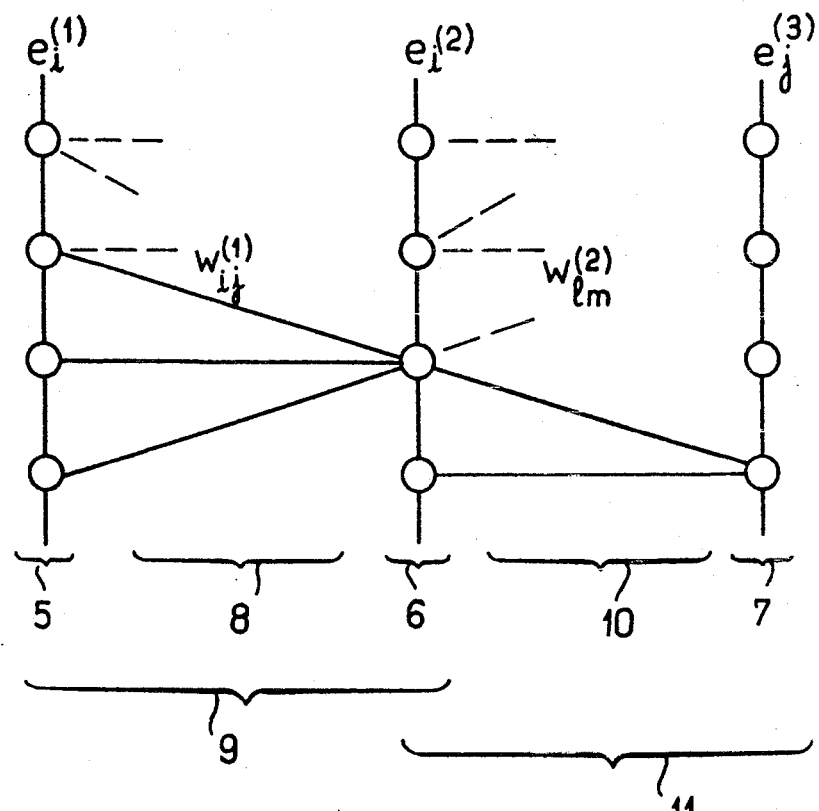
FIG_3
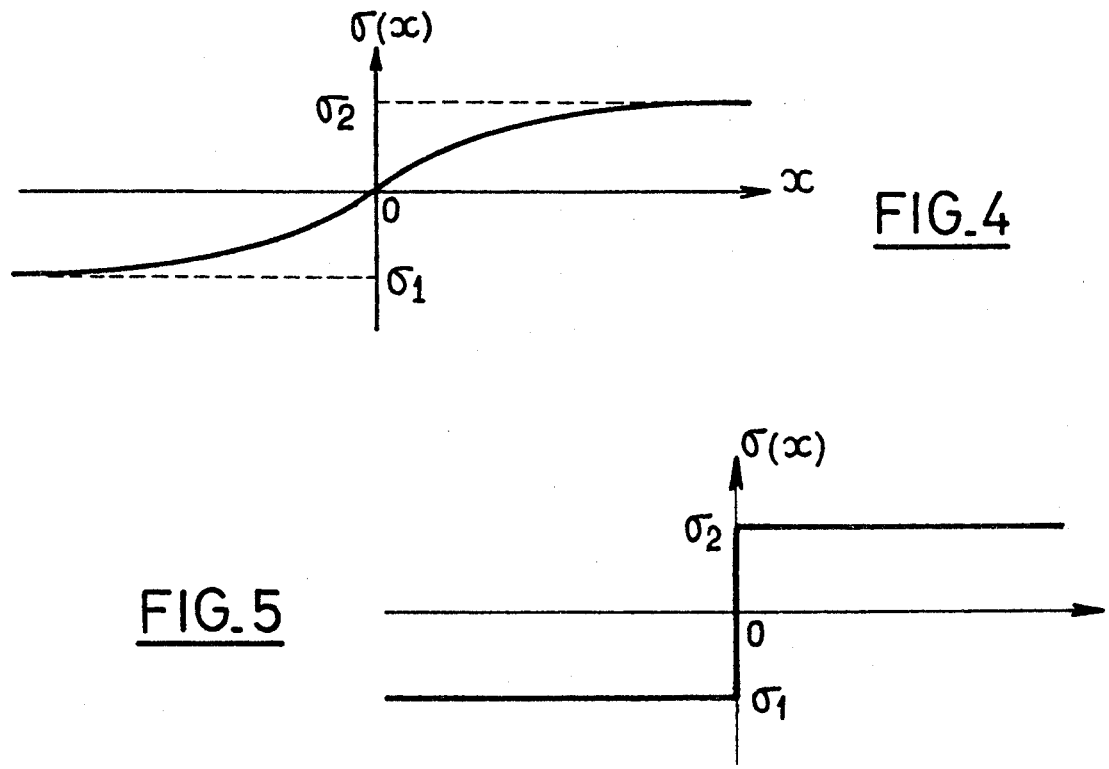
FIG_4
FIG_5

NON-LINEAR AND ADAPTIVE SIGNAL-PROCESSING DEVICE

This application is a continuation application Ser. No. 07/845,789, filed on Mar. 9, 1992, now abandoned, which is continuation of application Ser. No. 07/460,974, filed Feb. 13, 1990 now abandoned.

BACKGROUND OF THE INVENTION

The present invention relates to a non-linear and adaptive signal-processing device.

DISCUSSION OF BACKGROUND

To achieve a signal-processing operation designed, for example, for shape recognition, it is possible to use an electronic processor, but its processing capacity is presently too limited, especially if it is desired to perform this processing in real time.

Purely optical devices used to resolve this problem are also known, but these devices become very complicated when it is desired to provide them with a good degree of adaptability.

SUMMARY OF THE INVENTION

An object of the present invention is a signal-processing device that is adaptable easily and as quickly as possible and can process the greatest possible number of pieces of information as fast as possible, this device being as simple and as inexpensive as possible.

The processing device according to the invention is of the type comprising an image source, an optical valve, an optical interconnection device and a digital processing device, and this device of the invention is characterized in that the optical interconnection device is placed in the Fourier plane of the image, this plane being obtained optically, this interconnection device being followed by a non-linear, adaptive processing device.

Preferably, the optical interconnection device is of the holographic type.

According to one embodiment, the optical interconnection device is a hologram computed and/or synthesized by processor. It may be multiplexed spatially and/or in frequency.

According to one embodiment, the neuronal processor is a specialized processing circuit made with standard electronic technologies. According to another embodiment, the neuronal processor is a specialized processing circuit made with a digital computer (computer, minicomputer or microcomputer). According to yet another embodiment, the neuronal processor is a specialized processing circuit including ferro-electric matrices.

Advantageously, between the optical interconnection device and the non-linear, adaptive processing device, there is interposed a preliminary processing device, preferably a repositioning and/or standardization device.

BRIEF DESCRIPTION OF THE DRAWINGS

The present invention will be understood more clearly from the detailed description of an embodiment, taken as a non-restrictive example and illustrated by the appended drawings, wherein:

FIG. 1 is the simplified drawing of an optical correlator of a type known per se, used in the present invention;

FIG. 2 is the drawing of the correlator of FIG. 1, explaining the operation of correlation as used in the present invention;

FIG. 3 is the simplified drawing of a non-linear, adaptive device used in the present invention;

FIGS. 4 and 5 are graphs of examples of non-linear functions fulfilled by elements of the device of FIG. 3;

DETAILED DESCRIPTION OF THE PREFERRED EMBODIMENT

Figure 6:
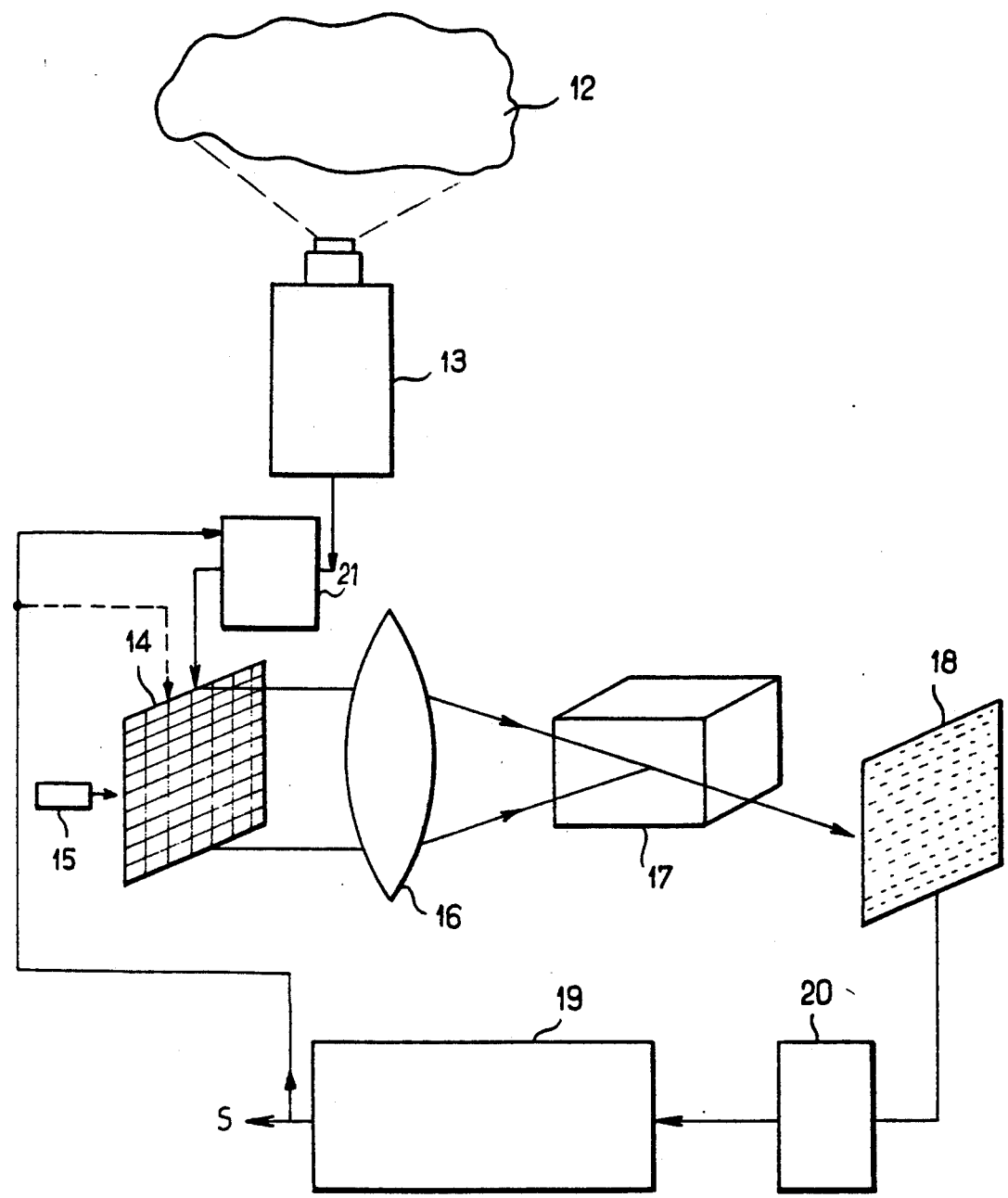
FIG. 6 is the simplified drawing of a processing device according to the invention.

The invention is explained here below with reference to the processing of images as used, for example, in shape-recognition systems, but it is clear that it is not restricted to such an application. The device of the invention can process a great variety of signals, such as vocal signals (speech recognition for example), or signals given by sensors of physical magnitudes (temperature, pressure, speed, strains) as well as signals given by electronic processors on their data bus. The adaptive character of the device of the invention enables it to be made to process problems of an heuristic order such as problems of optimization of modelling which could not be suitably resolved by standard processing devices.

The optical interconnection device which is, by its function, a preferably three-dimensional optical filter, used in a preferred embodiment of the invention, is a spatially multiplexed optical correlator using a hologram. This hologram may be a thin hologram and, advantageously, several holograms may be used, placed side by side. An embodiment such as this is described here below with reference to FIG. 7. According to another embodiment, a thick hologram (also called a volume hologram), made for example by means of a photorefractive crystal, is used.

As the optical correlator is well known per se, the following explanation of its operation shall be brief, to the extent necessary for an understanding of the invention.

For the embodiment with a volume hologram, different images $Im_i$ (i being the order of the images and ranging in value from 1 to M, M being the total number of images) are recorded holographically and successively in a photorefractive crystal 1. The spatial multiplexing of the images is done as follows. The information contained in each image $Im_i$ is transferred to an optic wave by modulating the amplitude and/or the phase of this wave. Thus to each image $Im_i$, symbolized in FIG. 1 by the rectangle 2, there corresponds an optical wave $A_i(x,y)$, x and y being the axes of the plane of the image 2. Each image may be recorded holographically in the crystal 1 by the interference of two optical waves. One of the two waves is the Fourier transform of $\widetilde{A}_i(x,y)$ transformed, which shall be written as $A_i(\nu,\mu)$. This Fourier transform is obtained simply by means of a lens 3. The other optical wave is a plane wave the direction $\theta i$ of which forms an angle $\theta i$ with the direction of the wave $\widetilde{A}_i(\nu,\mu)$. The result of the interference of these two waves in the crystal 1 is the creation of a grating with an index $\delta_{ni}(\nu,\mu)$ called a phase hologram, proportionate to the illumination grating $\delta I_i(\nu,\mu)$ in the crystal. Thus, all the M images are recorded sequentially in the crystal 1.

The correlation operation is explained here below with reference to FIG. 2. Take an order p image 4, ($1 \leq p \leq M$) marked $Im_p(x,y)$, for which it is sought to obtain the correlation with all the recorded images $I_{mi}(x,y)$. This image is read optically and the wave $Ap(x,y)$ is processed in the manner described below, by means of the lens 3 and the crystal 1. The lens 3 makes it possible to obtain, in its Fourier plane, the Fourier transform $\tilde{A}(\nu, \mu)$ of $\tilde{A}_p(x,y)$. The transformed wave $A_p(\nu,\mu)$ gets diffracted in the crystal 1 on all the index gratings. Depending on each of the directions $\theta_i$ of the reference plane waves corresponding to the M images, Cpi is noted as the amplitude of the diffracted light, and we get:

$$C_{pi} = \int_{crystal} \tilde{A}_p(\nu,\mu) \cdot A_i(\nu,\mu) d\nu \cdot d\mu$$

$= \frac{1}{4} A_p(x,y) A_i(x,y) dx\, dy$ (in the real plane). For more details, reference will be made, for example to "Optical Holography" by Collier, Burckhardt, Lin. Academic Press, 1971.

The photorefractive crystal 1, enabling the spatially multiplexed volume holographic recording, may be a crystal of lithium niobate $LiNbO_3$ or, advantageously, a silicon bismuth oxide $Bi_{12}SiO_{20}$ or any other photorefractive crystal.

According to one variant, the above-described variant may be achieved with holograms recorded photographically (for example, with bichromated elatine as descibed in the above-mentioned document "Optical Holography").

As a non-linear, adaptive processing device, the preferred embodiment of the invention uses a neuronal network.

There is no precise definition as yet of neuronal networks. We shall therefore give an explanation, here below, of what is understood by neuronal networks in the present invention, and then of how it puts them to use.

A neuronal network is a device that enables the performance of signal-processing operations and, more precisely, enables different output signals of the device to be associated with different sets of possible input signals. Moreover, this device "learns" this set of associations without any particular programming, but solely by presentation of different pairs (inputs, outputs) which it is desired to associate. This mode of operation is called supervised learning. The following are the chief characteristics of such a device from the viewpoint of the present invention:

It is not necessary to formulate the problem, and hence to describe or know the shape of the signals to be processed. It is enough to present them to the input of the device and, by comparing the output signals of the device with those desired, to carry out the above-described "learning" operation.

A device such as this can operate with high resistance to the noise affecting the input signal, or else with a low-resolution input signal.

Neuronal networks in layers are described here below, but it is clear that it is possible to use other structure having the same function, for example looped structures such as those described in T. Kohonen, "Self Organization and Associative Memory", Springer Verlag, 1984, and D. E. Rumelhart and J. L. McClelland, "Parallel Distributed Processing", MIT Press, 1986.

FIG. 3 gives a schematic view of the main elements of a neuronal network with several layers.

The input layer 5 is formed by $N_1$ signal input elements which may be non-linear as well as linear, marked $e^{(1)}_i$ ($i=1 \ldots N_1$). In repeating the notation of FIG. 2, the input signal is $|C_{pi}|^2$ and $N_2$ is equal to or greater than M. If the wave diffracted by the volume hologram is made to interfere with a plane wave, the input signal of the neuronal network could contain more information than just the input signal $|C_{pi}|^2$.

The second layer 6 is formed by $N_2$ non-linear elements $e^{(2)}_{i'}$ (with $i'=1 \ldots N_2$) called neurones. FIGS. 4 and 5 show two examples of the function that can be achieved by each neurone. The function $\sigma(x)$ of FIG. 4 is called a sigmoid function. The output (y-axis) is a monotonous function of the input (x-axis), defined from minus infinity to plus infinity, which has one saturation level at $\sigma 1$ and another at $\sigma 2$. The function of FIG. 5 has the value $\sigma 1$ from $-\infty$ to zero and the value of $\sigma 2$ from 0 to $+\infty$. The third layer 7 is formed by linear or non-linear elements $e^{(3)}_j$ (with $j=1 \ldots N_3$).

The elements of the layers 5 and 6 are connected by a linear interconnection layer 8 or matrix, marked $W^{(1)}_{ij}$ which gives a matrix product of its inputs. Thus, the set 9, including the layers 5, 8, 9, performs the operation:

$$e^{(2)}_i = \sigma\left[\sum_j^{N_1} W^{(1)}_{ij} e^{(1)}_j\right]$$

The elements of the layers 6 and 7 are connected by a linear connection layer 10, or matrix, marked $W^{(2)}_{lm}$, which also takes a matrix product of its inputs. Thus, the set 11, including the layers 6, 10, 7, performs the operation:

$$e^{(3)}_l = \sigma\left[\sum_{m=1}^{N_1} W^{(2)}_{lm} e^{(2)}_m\right]$$

Of course, the invention is not restricted to three layers but may have more of them. It is necessary and sufficient for one of them to have non-linear elements.

In practice, in each of the layers of neurons (when there are several layers of neurons or non-linear elements), there is introduced a neuron, the value of which remains fixed at 1. This makes it possible to perform, for each neuron of the following layer, the function $\sigma(x-a)$, in which a is the value of the connection between this latter fixed neuron of the preceding layer, and x is the input signal of this preceding layer.

To enable the use of a neuronal network device as defined above, it is necessary, beforehand, to carry out a "supervised" learning operation. The learning is the computation of the values of the connections $W^n_{ij}$ (with $n=1 \ldots L-1$ if it has L layers of neurons, or non-linear layers) within the context of the problem to be resolved. For the details of the different methods that enable this computation, we might refer, for example, to the above-mentioned Springer Verlag and MIT Press publications. Here below, we shall explain only the general principle of supervised learning which forces the device to adapt itself so as to be able to perform the different tasks of association imposed on it.

Random connection values are chosen. Different inputs among the pairs (inputs, output), which it is desired that the device should associate, are presented successively. For each of the inputs presented, the output obtained by the device is compared with the desired output and, from the error between these two outputs, the corrections that have to be made on the interconnection matrices, to reduce this error, are deduced. The learning is stopped when the device no longer makes errors on the examples presented to it.

One of the essential characteristics of a device such as this is its immunity to noise. For, when the learning has been done properly, when a noise-infested input signal, that has not been presented previously, is presented to the device, the output signal is the one corresponding to an input signal that is not noise-infested.

With reference to FIG. 6, we shall now describe an exemplary embodiment of the processing device of the invention.

In this example, the sources of input signals are images 12, for example slides, photographs on paper etc. These images ar analyzed by a TV or video camera 13 and the resultant signals are sent to a spatial modulator 14, for example of the liquid crystal type, cooperating with a laser emitter 15. The spatial modulator could work by the encoding, in amplitude or in phase, of the optical wave. For, to perform the optical recording of these images, it is necessary to produce optical waves that are monochromatic (for one and the same recording operation) and coherent, to be able to make these waves interfere. However, for distinct recording operations it is possible, if necessary, to change the wavelength of these optical waves. Thus, a frequential multiplexing is associated with the spatial multiplexing of the optical correlator. The images 12 are recorded optically in the form of volume holograms multiplexed spatially, as explained below with reference to FIG. 1, by means of a lens 16 and a photorefractive crystal 17.

The acquisition of the diffracted light intensities coming forth from the crystal 17 is done by a detector 18. This detector is, for example, a CCD TV or video camera or a linear array of photodiodes.

The output signals from the detector 18 are sent to a neuronal processor 19. This processor may be made in different ways: for example, either as a computer or micro-computer (the neuronal functions and the interconnections are simulated numerically therein), or as a specialized processor enabling the performance of the (non-linear) neuronal functions and the interconnections. Examples will be found in the article "Parallel Architecture for Neurocomputers" by Philips Treleaven in *Proceedings of the European Seminar on Neural Computing*, February 1988. Advantageously, between the detector 18 and the processor 20, there is interposed a device 20 for preliminary processing, for example for repositioning around zero or for standardization, for example to place all the correlation peaks between $-1$ and $+1$ (or $\sigma1$ and $\sigma2$).

According to an advantageous embodiment of the invention, there is interposed, between the TV or video camera 13 and the modulator 14, an electronic pre-processing (processing of contour, contrast etc.) device 21, the output of the processor 19 being connected in a feedback arrangement with this device 21. According to one alternative embodiment, if the modulator 14 has electronic means enabling an image processing to be done, it is possible to connect the output of the processor 19 to these means (connections shown in broken lines in FIG. 6).

The neuronal processor of the device of FIG. 6 is is made to undergo the learning operation in the way explained above with reference to FIG. 3, by being presented with the signals from the detector 18 corresponding to all the images recorded by volume holography, and by modification of the values of the interconnections of the neuronal processor as a function of the difference between the actually obtained output and the desired output, this being done as many times as is necessary for the processor to no longer make any errors.

The processing proper, done by the device of FIG. 6, consists in the presenting of images to the TV or video camera 13 and in the reading of the output signals from the processor 19. These images presented to the TV or video camera 13 include, of course, certain analogies or common points with the images that have been used for the learning. To simplify the explanations, we shall refer here below to the letters of the alphabet but it is clear that the device of the invention can process, and is above all designed to process, far more complex images. For the learning operation, these letters, handwritten by different persons, are recorded and for the processing proper, the device is made to recognize these very same letters handwritten by other persons. For the recognition of shapes of objects, the learning is done on photographs, of differing quality, of these objects, thus making it possible to subsequently recognize these very same objects even when they are indistinct (in motion or filmed under poor conditions).

It is also possible to process different recorded image of the images to be recognized (it being possible for the number of images to be greater than or equal to the number of recorded images). The recorded images may be filters determined a priori, enabling the projection of the images to be recognized on a fixed basis. For example, these filters may be determined a priori for the type of problem that it is desired to resolve, but independently of the precise images that it is desired to recognize.

The recorded images (or the filters) may also be built from the images to be recognized (as for example in the case of non-redundant filters). Cf. for example the article by D. CASASENT in Applied Optics, vol. 23, No. 10, 15th May 1984, pp. 1620 and ff. This may enable, for example, the recognition of a number of images greater than the number of images recorded. However, a possibility such as this is offered by the first recognition device referred to above, if noise-infested images or images affected by small transformations such as distortion or rotation are considered to be different from the recorded images.

The above-described device has several major advantages over the known devices.

It is well known that the number of pixels enabling an accurate representation (notably in terms of resolution) of an image is very great. For example, the minimum number of pixels to recognize a face from a digitally encoded photograph is in the range of $10^5$. Furthermore, the number of levels of gray should be at least eight if the information borne by the image is not be be excessively limited from the very start of the processing. Hence, if it is desired to digitally perform the correlations of an image with, for example, 1000 images, it is necessary to perform $10^8$ multiplications of three-bit words. At present, it is not realistic to consider that, with existing microprocessors, this computation time could be smaller than a few hundreds of seconds. Furthermore, the images recorded would require a memory of 37.5 mega-octets, which would imply processing times that are far too lengthy for processing in real time.

By contrast, the optical correlator of the device of the invention enables these images to be recorded very easily, by volume holography, and to perform correlation operations in real time. According to one exemplary embodiment, it is possible to record about 1000 images, each having about $10^6$ pixels and, subsequently, the computation time is in fact restricted by the acquisition times of the diffracted intensities, hence smaller than the rate of the video images (1/25th of a second) in the case of a video camera acquisition system.

Another very important advantage is that the combination of the optical correlator and of the neuronal processor enables a processing of information taking into account all the correlation peaks. One particularly simple mode of operation of the optical correlator lies in considering that the image $A_{io}(x,y)$ recognized when an image $A_p(x,y)$ is presented is the one for which the correlation $C_{Pi}$ is the maximum. To optimize the working of the device, it is possible to carry out several processing operations on the correlation peaks, for example a pre-processing such as is done by the device 20, or other processing operations known per se.

Through its learning mode, the neuronal processor can be adapted to the imperfections of the optical correlator. This adaptive feature of the neuronal processor is very important for it enables the full use of the capacities of the optical correlator without any need to be concerned aboout its imperfections since they are automatically taken into account in the device for the neuronal processing of the correlation peaks.

From a theoretical point of view, the operation performed by the optical correlation may be formally identified with the one performed by a matrix of interconnections. It is enough to name $e^{(o)}_i (i=1 \ldots M_p)$, the M pixels given by the image sensor device and $W^{(o)}_{li^p}$, the $i^{th}$ pixel of the $1^{th}$ image recorded by volume holography in the photorefractive crystal to realise this aspect more clearly. The continuous summation that appears in the correlation operation is equivalent to a discrete summation, at least from the formal point of view. The above-mentioned layer $e^{(1)}_i$ of neurons then fulfils a non-linear function which may be different from the one fulfilled by the other intermediate layers, if any, of neurons.

Thus, the device of the invention may be considered to be a neuronal processor that can fulfil arbitrary functions and has a great number of input neurons. The first layer (optical correlator) fulfils the "information contraction" function (for the example referred to, a passage from $10^6$ pixels to $10^3$ correlation peaks), making it possible to achieve magnitudes, for the matrix of interconnections, that can easily be processed by standard electronic circuits.

Figure 7:
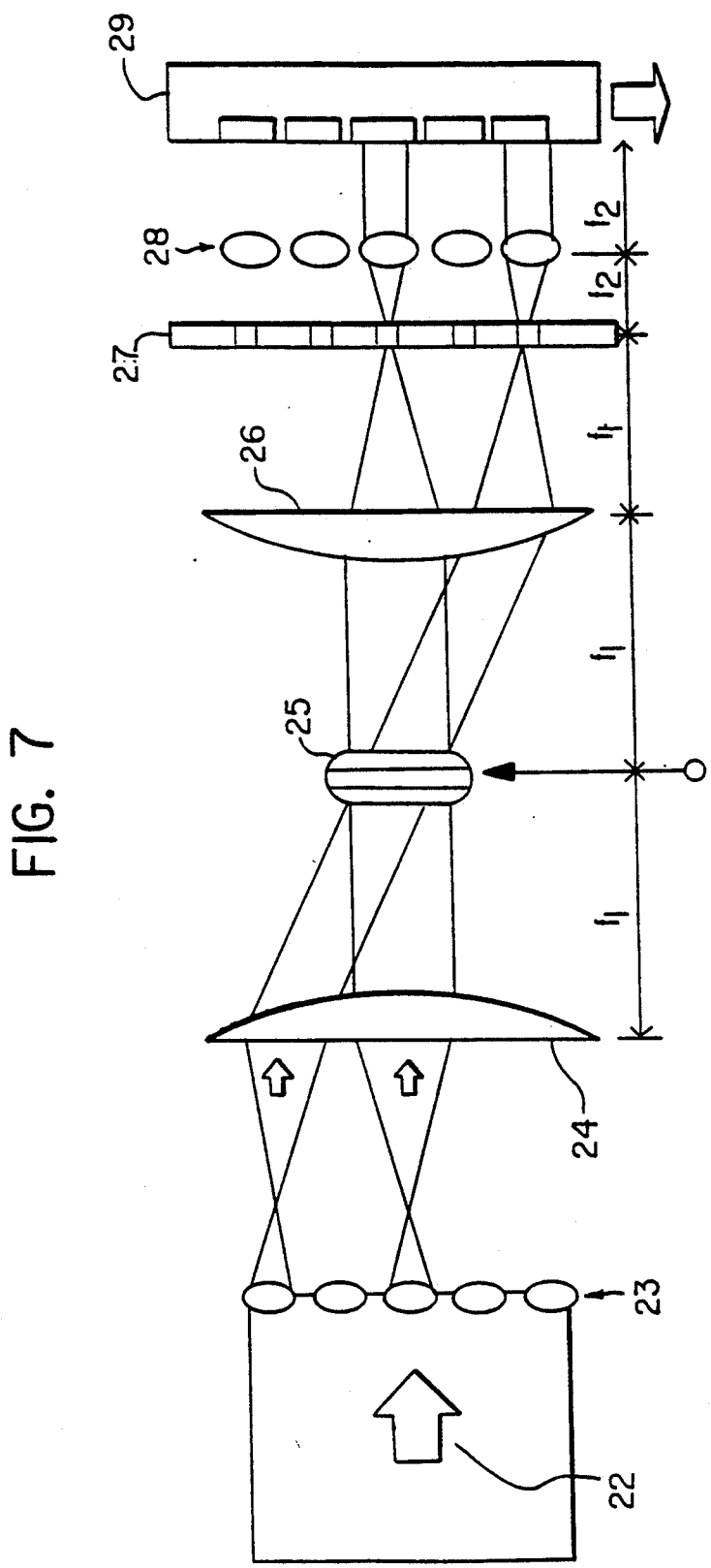
FIG. 7 is the simplified drawing of a variant of a device according to the invention.

FIG. 7 shows a schematic diagram of a multiple-channel device with spatially multiplexed filters. This device has a light source 22 illuminating a network 23 of lenses. The network 23 is followed by a Fourier lens 24, a spatial modulator 25 (such as the modulator 14 of FIG. 6 and, like this modulator 14, connected to an image source such as the TV or video camera 13, possibly followed by an electronic pre-processing device such as the device 21), a Fourier lens 26, a matrix 27 of holographic filters placed side by side in a plane and different from one another, a set 28 of micro-lenses giving the reverse Fourier transform of the spatially modulated wave, and a detector 29, for example a CCD TV or video camera. The signal of the detector 29 is processed in the same way as that of the detector 18 of FIG. 6, by devices similar to the devices 20 and 19 (and, as the case may be, 21) of this FIG. 6.

In this device of FIG. 7, each filter of the set 27 corresponds to an image $Im_i(x,y)$, and its optical Fourier transform $\tilde{A}_i(v,\mu)$ is recorded.

If $Im(x,y)$ is the image to be recognized at each filter $\tilde{A}_i(v,\mu)$, the device of FIG. 7 performs the operation:

$$\tilde{A}_i(v,\mu) \cdot \tilde{A}_p(v,\mu)$$

which makes it possible, by means of a second lens (of the set 28), to obtain the correlation functions $C1(x,y)$:

$$Cip(x,y) = \left[ \int_\beta \int_\alpha \tilde{A}_p(x-\alpha, y-\beta) \cdot \tilde{A}_c(\alpha,\beta) d\alpha d\beta \right]^2 ,$$

each of the correlation functions being addressed to a sub-window of the detection plane 29, each of the peaks addressing only one of these sub-windows and, naturally, being capable of moving within it. This method makes it possible to obtain a invariancy with respect to the translation.

We claim:

1. A device for processing non-linear adaptive signals, comprising:
    an image source outputting an image signal to an optical valve, said optical valve including a means for producing and outputting coherent optical waves;
    an optical interconnection device receiving said output coherent optical waves from said optical valve wherein said optical interconnection device includes an optical filter wherein said optical filter includes a means for optically providing a Fourier plane of said image from said source and wherein said optical interconnection device provides an output;
    a non-linear, adaptive neuronal processor receiving the output of said optical interconnection device.

2. Signal processing device according to the claim 1, characterized by the fact that the optical interconnection device is of the holographic type.

3. Signal processing device according to the claim 1, characterized by the fact that the optical filter is a phase filter.

4. Signal processing device according to the claim 1 or 3, characterized by the fact that the optical filter is an amplitude filter.

5. Signal processing device according to the claim 1, characterized in that the optical filter is computed and/or synthesized by processor.

6. Signal processing device according to claim 1, characterized by the fact that the optical filter is a spatially multiplexed optical correlator (16, 17).

7. Signal processing device according to the claim 6, characterized by the fact that the optical correlator includes a volume photorefractive crystal (17) associated with an optical lens (16).

8. Signal processing device according to claim 1, characterized by the fact that the optical filter is multiplexed in frequency.

9. Signal processing device according either of the claim 6 or 7, characterized by the fact that the optical correlator is formed by several thin holograms arranged side by side (27).

10. Signal processing device according to claim 1, characterized by the fact that the non-linear, adaptive processing device is connected in feedback, upstream with respect to the optical filter.

11. Signal processing device according to the claim 10, characterized by the fact that the feedback connection is connected to a specialized processor (21) for image processing, placed upstream with respect to the optical valve.

12. Signal processing device according to the claim 10 or 11, characterized by the fact that the optical valve includes electronic means that provide for an image processing operation.

13. Signal processing device according to claim 10, characterized by the fact that the feedback loop is connected to the optical valve.

14. Signal processing device according to the claim 1, characterized by the fact that the neuronal processor is a specialized processing circuit set up with standard electronic technologies..

15. Signal processing device according to the claim 1, characterized by the fact that the neuronal processor is a specialized processing circuit set up with a digital computer.

16. Signal processing device according to the claim 1, characterized by the fact that the neuronal processor is a specialized processing circuit including ferro-electric matrices.

17. Signal processing device according to claim 1, characterized by the fact that a preliminary processing device (20) is interposed between the optical interconnection device and the non-linear, adaptive processing device.

18. Signal processing device according to the claim 17, characterized by the fact that the preliminary processing device includes a repositioning device.

19. Signal processing device according to the claim 17, characterized by the fact that the preliminary processing device includes a standardization device.

* * * * *